United States Patent [19]

Sugiura et al.

[11] Patent Number: 5,434,005
[45] Date of Patent: Jul. 18, 1995

[54] AQUEOUS COMPOSITION

[75] Inventors: Tomiya Sugiura; Hideki Nakagawa; Takao Doi; Shigeyuki Kozawa, all of Yokohama, Japan

[73] Assignee: Asahi Glass Company Ltd., Tokyo, Japan

[21] Appl. No.: 31,296

[22] Filed: Mar. 12, 1993

Related U.S. Application Data

[62] Division of Ser. No. 590,691, Oct. 1, 1990.

[30] Foreign Application Priority Data

Oct. 3, 1989 [JP] Japan ................ 1-257111
Nov. 2, 1989 [JP] Japan ................ 1-285008
Apr. 6, 1990 [JP] Japan ................ 2-90386

[51] Int. Cl.$^6$ ............... B05D 3/02; C08G 18/81
[52] U.S. Cl. ............... 428/423.1; 427/385.5; 428/423.7; 524/591; 524/839; 524/840; 528/45; 528/66
[58] Field of Search ............... 524/591, 839, 840; 528/66, 45; 428/423.1, 423.7; 427/385.5

[56] References Cited

U.S. PATENT DOCUMENTS 4,119,602 10/1978 Isgur et al. ................ 528/45
4,448,922 5/1984 McCartney ................ 524/443
4,701,480 10/1987 Markusch et al. ................ 524/840

OTHER PUBLICATIONS

Webster's Ninth New Collegiate Dictionary, p. 1298 "urethane".

*Primary Examiner*—Paul R. Michl
*Assistant Examiner*—Patrick Niland
*Attorney, Agent, or Firm*—Oblon, Spivak, McClelland, Maier & Neustadt

[57] ABSTRACT

An aqueous composition comprising a carboxylate group-containing blocked polyurethane and water as essential components, wherein said polyurethane is a reaction product of a carboxylic acid (or carboxylate) group-containing polyoxyalkylene polyol containing at least 50% by weight of oxyethylene groups, with an average number of hydroxyl groups being more than 2 and having, on an average, from 0.005 to 0.8 —COOX group (X: a hydrogen atom or a cation) per molecule at the backbone chain terminals, a polyisocyanate having isocyanate groups in an amount stoichiometrically in excess of the hydroxyl groups of said polyol, and a blocking agent in an amount corresponding to the stoichiometrically excess amount of said polyisocyanate, and when X is a hydrogen atom, X is converted to a cation at an optional stage.

11 Claims, No Drawings

AQUEOUS COMPOSITION

This is a division of application Ser. No. 07/590,691, filed on Oct. 1, 1990.

The present invention relates to an aqueous composition containing a reactive polyurethane.

Urethane resins have high affinity and high adhesive strength to various substrates such as fibers, paper materials, wood materials or plastics, and aqueous urethane resin solutions are widely used as fiber treating agents, as paper treating agents or as adhesives for resins or films. However, with so-called polyurethane aqueous solutions wherein the reaction has been completed during the preparation of the aqueous solutions, the penetration properties are poor, whereby it frequently happens that the aqueous solutions can not adequately be diffused into the substrates, or since the solutions by themselves have already lost the reactivity, they can not provide strong adhesive strength by the formation of a covalent bond. Whereas, the reactive urethane aqueous solution i.e. an aqueous urethane solution containing so-called blocked isocyanate, maintains flowability and viscosity even after the evaporation of water and is able to spread on or penetrate into even a substrate having a relatively high hydrophobic nature, whereby bonding can successfully be carried out. Further, by virtue of high reactivity of isocyanate regenerated by e.g. heating, firm bonding can be established with the substrate. With such features, some products have been commercially available.

However, such conventional blocked isocyanate compounds have a difficulty such that with the ones having adequate pot life for usual use, thermal curability is inadequate, and a high temperature and/or a long period of time is required for curing, such being undesirable from the viewpoint of a process. Further, it has been proposed to incorporate a catalyst immediately prior to the use to improve the curing property. However, such an attempt involves many problems such as the cumbersomeness involved in the incorporation of the catalyst and stirring, the toxicity of a heavy metal compound such as tin or lead and a problem involved in post treatment.

The present invention has been made to solve such problems.

The present invention provides an aqueous composition comprising a carboxylate group-containing blocked polyurethane and water as essential components, wherein said polyurethane is a reaction product of a carboxylic acid (or carboxylate) group-containing polyoxyalkylene polyol containing at least 50% by weight of oxyethylene groups, with an average member of hydroxyl groups being more than 2 and having, on an average, from 0.005 to 0.8 —COOX group (X: a hydrogen atom or a cation) per molecule at the backbone chain terminals, a polyisocyanate having isocyanate groups in an amount stoichiometrically in excess of the hydroxyl groups of said polyol, and a blocking agent in an amount corresponding to the stoichiometrically excess amount of said polyisocyanate, and when X is a hydrogen atom, X is converted to a cation at an optional stage.

Now, the present invention will be described in detail with reference to the preferred embodiments.

To the aqueous composition of the present invention, additives may further be incorporated. One of preferred additives is a polyfunctional compound. The polyfunctional compound is a compound having at least two functional groups reactive with isocyanate groups. At the time of curing the carboxylate group-containing blocked polyurethane, the polyfunctional compound reacts with the regenerated isocyanate groups to crosslink the polyurethane, whereby the physical properties such as toughness and heat resistance of the cured polyurethane will be improved. The polyfunctional compound may suitably be incorporated in an amount of from 0.01 to 1 time by equivalent to the regenerated isocyanate groups.

Another preferred additive is a fatty acid ester. When the aqueous composition is used as a binder for a fiber product, flame retardancy is sometimes required for the binder. As flame retardants for synthetic resins, compounds containing phosphorus or halogen are widely used. However, if a flame retardant containing phosphorus or halogen is incorporated to the above aqueous composition, the physical properties of the cured polyurethane tend to be poor. The present inventors have found that the flame retardancy can be improved by incorporating a fatty acid ester normally containing no phosphorus or halogen to the above aqueous composition. The fatty acid ester is highly hydrophobic, and it is preferred to incorporate it to the blocked polyurethane before the blocked polyurethane is mixed with water. Such a fatty acid ester is preferably incorporated in an amount of from 5 to 20 parts by weight relative to 100 parts by weight of the blocked polyurethane.

Now, the materials for the composition of the present invention will be described.

(1) The polyoxyalkylene polyol prior to the introduction of carboxylic acid (carboxylate) groups The polyoxyalkylene polyol is a polyoxyalkylene polyol obtained by mixing or sequentially reacting an initiator with ethylene oxide or with ethylene oxide and other alkylene oxide. It may further be a mixture of at least two polyoxyalkylene polyols. The initiator is a compound having hydrogen atoms (hydrogen atoms of hydroxyl groups or amino groups) to which at least bivalent, particularly from 2 to 8 valent, alkylene oxides can be reacted. Preferably, it is at least one member of 3 and 4 valent initiators, or a mixture thereof with a bivalent or at least 5 valent initiator. As the initiator, a polyhydric alcohol is particularly preferred. The polyoxyalkylene polyol may be a mixture with other high molecular weight polyol containing no oxyethylene group or a small proportion of oxyethylene groups. Such other high molecular weight polyol includes a polyoxyalkylene polyol containing a small amount of oxyethylene groups, a polyether ester polyol containing a small number of ester groups, a polycarbonate polyol and a polyoxytetramethylene polyol.

This polyoxyalkylene polyol is required or preferably desired to satisfy the following conditions.

Average content of oxyethylene groups: at least 50% by weight, preferably from 60 to 95% by weight, more preferably from 70 to 90% by weight. Accordingly, it preferably contains a small amount of other oxyalkylene groups, preferably oxypropylene groups, in addition to the oxyethylene groups. If the content of oxyethylene groups is small, the stability of the composition of the present invention against pH change tends to decrease.

Average number of hydroxyl groups: preferably more than the 2, more preferably from 2.3 to 8, particularly preferably from 2.6 to 4. If the number of hydroxyl group is small, the curability of the polyurethane, or the adhesive properties tend to decrease.

Average molecular weight per hydroxyl group: preferably from 200 to 4,000, more preferably from 300 to 3,000. If the molecular weight is low, the cured product of polyurethane tends to be hard and brittle, and toughness is hardly obtainable. On the other hand, if the molecular weight is too high, the penetration properties or the adhesiveness of the blocked polyurethane tends to be inadequate.

(2) Introduction of —COOX groups to the above polyoxyalkylene polyol, and the resulting carboxylic acid (or carboxylate) group-containing polyoxyalkylene polyol It is preferred to introduce —COOX groups to the above polyoxyalkylene polyol by esterification or conversion to urethane. The esterification is conducted by reacting a polycarboxylic anhydride or a reactive polycarboxylic acid derivative having a reactive carboxylic acid group and a —COOX group. The conversion to urethane is conducted by reacting a compound having an isocyanate reactive group (such as a hydroxyl group, a primary amino group or a secondary amino group) and a —COOX group, with a polyisocyanate (at least one of isocyanate groups of the polyisocyanate is reacted to the hydroxyl group of the above polyoxyalkylene polyol, and at least one of other isocyanate groups is reacted to the isocyanate reactive group of the above —COOX group-containing compound) or with a compound having a —COOX group and an isocyanate group.

Such carboxylic acids include, for example, maleic acid, fumaric acid, phthalic acid, malonic acid, adipic acid, trimelitic acid, butanetetracarboxylic acid, and reactive derivatives of these polycarboxylic acids such as anhydrides or acid chlorides. The isocyanate reactive carboxylic acids include, for example, dimethylol propionic acid and amino acid.

X of the —COOX group may be a hydrogen atom or a cation. The cation may be ammonium, $NR_4$ (R: at least one is a monovalent organic group such as an alkyl group, and the rest is a hydrogen atom), phosphonium, or an alkali metal ion. Particularly preferred is an alkali metal ion. X in the —COOX group of the blocked polyurethane is eventually a cation, and the —COOM group is converted to a salt form at an optional stage.

The number of —COOX groups to be introduced into the above polyoxyalkylene polyol is preferably from 0.05 to 0.8 group per molecule of the polyoxyalkylene polyol, on an average. More preferably, it is from 0.01 to 0.6 group, and particularly preferably, it is from 0.04 to 0.4. Further, the number of —COOX groups per hydroxyl group of the polyoxyalkylene polyol is preferably from 0.002 to 0.4 group, particularly preferably from 0.005 to 0.3 group. Such an amount is influential over the stability to water or the curing properties of the blocked polyurethane. Namely, if the amount is too small, both the stability and the curing properties tend to be inadequate, and if it is too much, the curing properties tend to be so high that there will be a difficulty in handling. Accordingly, in an introduction method wherein one —COOX group is formed as in the case of e.g. a dicarboxylic anhydride, a compound for introducing from 0.005 to 0.8 mol of the —COOX group per mol of the polyoxyalkylene polyol, is used.

In the carboxylic acid (or carboxylate) group-containing polyoxyalkylene polyol having thus —COOX groups introduced, the average number of hydroxyl groups is preferably more than 2, more preferably at least 2.1, especially at least 2.3. The upper limit is 6, preferably 3.5. Further, it is possible to obtain the desired carboxylic acid (or carboxylate) group-containing polyoxyalkylene polyol by firstly producing a polyoxyalkylene polyol having a larger number of —COOX groups than desired with an average of less than one —COOX group per molecule, and then mixing it with a polyoxyalkylene polyol having no —COOX group.

(3) Blocked polyurethane

In the present invention, the blocked polyurethane is obtained by reacting the above carboxylic acid (or carboxylate) group-containing polyoxyalkylene polyol, a polyisocyanate and a blocking agent. This blocked polyurethane contains at least about two blocked isocyanate groups and substantially no free isocyanate group. This polyurethane can be produced by a usual method. Namely, it can be obtained by reacting an isocyanate-terminated prepolymer obtained by reacting a polyol with a polyisocyanate, with a blocking agent, or by reacting a partially blocked polyisocyanate with a polyol. In the former case, the blocking agent may be used in an excess amount, and the unreacted blocking agent may remain in the composition. Usually, it is used in an excess amount of from 1.2 to 2.0 times in equivalent.

In the conversion to urethane, the ratio of the polyisocyanate groups to the hydroxyl groups in the carboxylic acid (or carboxylate) group-containing polyoxy alkylene polyol (NCO/OH) is usually within a range of from 1.2 to 2.5, preferably from 1.5 to 2.0. Accordingly, the blocking agent will react with the excess amount i.e. (NCO/OH) $-1$ equivalent. This equivalent ratio is preferably applied in each of the above mentioned two methods for the blocked polyurethane. (In the above mentioned method, a further excess amount may be employed.) Further, the amount of —COOX groups in the blocked polyurethane, is preferably from 0.02 to 3%, more preferably from 0.05 to 1.5%, as calculated as —COOH groups.

The reaction is conducted usually in the absence of any solvent or in the presence of a non-reactive solvent. The reaction is conducted usually at a temperature of from room temperature to 160° C., preferably from 60° to 120° C. A catalyst may be used in this reaction, but, it is preferred that the catalyst is not an organic metallic compound. Because, the organic metallic compound tends to decrease the stability of the blocked polyurethane in the final aqueous composition and thus tends to create a problem in dispersion in water as will be described hereinafter. When a catalyst is used, it is preferably an amine catalyst, more preferably a tertiary amine catalyst.

The blocked polyurethane is required to be such that in a state finally dispersed or dissolved in water, the —COOX groups are in the form of carboxylate groups (i.e. X is a cation). If —COOX groups in the polyoxyalkylene polyol are —COOH groups, the hydrogen atom for X is required to be converted to a cation at a certain stage. This conversion can be conducted in a state where the blocked polyurethane is dispersed or dissolved in water, or the conversion can be conducted in any earlier optional stage.

The blocked polyurethane can be dispersed or dissolved in any optional proportion. Preferably, however, the blocked polyurethane is from 50 to 70% by weight, more preferably from 10 to 50% by weight, relative to the total amount of the polyurethane and water. Further, the composition may contain other components, for example, various additives such as resins or coloring agents.

(4) The above mentioned raw material polyisocyanate and blocking agent.

As the polyisocyanate, a polyisocyanate having an average number of functional groups per molecule being at least 1.8, preferably from 2 to 4, is preferred. The content of isocyanate groups is preferably at least 10%, more preferably at least 20%. The polyisocyanate may be a so-called yellowed polyisocyanate. Otherwise, the yellowed and non-yellowed polyisocyanates may be used in combination. Preferably, a highly reactive yellowed polyisocyanate is employed. Specific polyisocyanates include, for example, tolylene diisocyanate (TDI), diphenylmethane diisocyanate (MDI), naphthalene diisocyanate (NDI), xylylene diisocyanate (XDI), methylene bis(cyclohexylisocyanate) ($H_{12}$MDI), hexamethylene diisocyanate (HDI), isophorone diisocyanate (IPDI), and their modified products (nurate-modified products, prepolymer-modified products and carbodiimide-modified products).

As the blocking agent, various types of blocking agents for isocyanate groups, may be employed. For example, phenols, mercaptans, oximes, malonic acid diesters, acethyl acetone, acetoacetic acid esters, and lactams, may be mentioned.

The blocked product having the above mentioned partially carboxylated polyol used, has in its molecule a catalyst necessary to improve the dissociation of the blocking agent and the subsequent curing properties in the form of a carboxylate, and this catalyst and the isocyanate residue can efficiently interact at molecular levels, whereby curing can be done with a minimum amount of the catalyst and under a mild curing condition. Whereas, a usual catalyst is present in an aqueous phase when it is water-soluble. When it is oil-soluble, the catalyst may be added after it is converted to be aqueous by means of e.g emulsification, but it will be present in the form of particles separate from the blocked product. As another method, there is a method wherein an oil-soluble catalyst is forcibly stirred and dispersed in an aqueous solution of the blocked compound. However, the compatibility with the hydrophilic blocked product of the present invention is poor. Thus, in the process of incorporating a usual catalyst, the catalyst efficiency is low, and an excess amount of the catalyst is required. This excess amount tends to substantially reduce the thermal stability or the storage stability of the polyurethane resin after the curing. Thus, in the present invention, it is preferred that the aqueous composition contains substantially no organic metallic catalyst.

(5) Polyfunctional compound

The polyfunctional compound is a compound having at least two functional groups (such as hydroxyl groups or amino groups) reactive with isocyanate groups. For example, it includes not only so-called polyfunctional alcohols or saccharides such as trimethylol propane, pentaerythritol, sorbitol, sucrose and triethanolamine, but also so-called polyfunctional amines such as ethylenediamine and diethylenetriamine.

From the viewpoint of the curing properties, it preferably has at least three functional groups on an average, and particularly preferred are polyfunctional alcohols or saccharides.

As the method for addition, when said compound is water-soluble, it may be added directly to the blocked urethane aqueous solution, or it may be added in the form of an aqueous solution. When it is hardly soluble in water, it may be added and mixed to the blocked polyurethane before the polyurethane is dispersed in water. In the case of a liquid, it may be added subsequently to the blocked polyurethane aqueous solution under strong agitation.

It is added preferably in an amount of from 0.01 to 1 times in equivalents, preferably from 0.2 to 1.0 times in equivalents, relative to isocyanate groups regenerated under heating.

If the amount is less than the above, the effects for the improvement in the toughness and heat resistance of the resulting cured product will be inadequate. On the other hand, if it is added excessively, it remains unreacted in the cured product, whereby the properties of the cured product tend to be low.

(6) Fatty acid ester

The fatty acid ester may be a lower fatty acid ester having a boiling point of at least 150° C. such as diethyl malonate, a higher fatty acid ester such as methyl stearate or ethyl stearate, a mixture of higher fatty acid esters such as soybean oil, rapeseed oil, olive oil, or so-called oils and fats. From the viewpoint of the cost and easiness for addition, oils and fats are preferred. Particularly preferred are those in the form of a liquid.

As the method for addition, when the compound is liquid, it may be added to the blocked polyurethane aqueous solution under strong agitation, or it may be added to the blocked polyurethane before the latter is dissolved or dispersed in water. When said compound is solid, the latter method is preferred to uniformly disperse it.

It is added preferably in an amount of from 5 to 20 parts by weight, relative to 100 parts by weight of the blocked polyurethane. If the amount is less than 5 parts by weight, it tends to be difficult to obtain adequate flame retardancy. On the other hand, if it exceeds 20 parts by weight, there will be a deterioration of the inherent properties of the blocked polyurethane.

The composition of the present invention is useful as an adhesive or as a binder. For example, it is useful as an adhesive or as a binder for fibers, papers, woods, plastics or other substrates.

The composition of the present invention is particularly suitable as an adhesive or as a binder for woven fabrics, non-woven fabrics or other fiber materials. In particular, it is suitable as a binder for producing a relatively thick flexible porous fiber product (a bound fiber mat) wherein monofilaments are bound by the binder in a bulky state. This mat can be used, for example, as a cushion for an automobile sheet. Specifically, such a bound fiber mat is produced by crimping polyester fibers to obtain a web, then applying the composition of the present invention to this web by e.g. impregnation or spraying, followed by drying, heating or simultaneous drying and heating, to obtain a bound fiber mat. When the polyurethane is cured by heating, it is possible to mold it by means of a mold.

When the composition of the present invention having the fatty acid ester incorporated, is employed for the production of the cushion, it is possible to improve the flame retardancy of the cushion. If a cushion obtained by using the composition of the present invention having no fatty acid ester incorporated, is subjected to a conbustion test, the polyurethane easily catches a fire, and the fire propagates quickly because of the above mentioned structure, whereby the polyurethane will be burned out completely. On the other hand, when a fatty acid ester is present, although its function is not necessarily clear, the fluidity and the surface properties of the resin at a high temperature are remarkably improved, whereby a structure wherein the polyester fibers are partially "naked" is obtainable. When such a structure catches a fire, the polyester fibers melt at a high temperature, whereby the propagation of the fire via the resin will not take place as mentioned above, whereby an excellent self-extinguishing property will be obtained.

Now, the present invention will be described in further detail with reference to Examples. However, it should be understood that the present invention is by no means districted to such specific Examples. Further, "parts" referred to hereinafter means "parts by weight".

EXAMPLE 1

① Preparation of a partially carboxylated polyol

To 2,500 parts of a polyoxyethylene-oxypropylene polyol having an average molecular weight of 2,500 (trifunctional, oxyethylene groups: 80% by weight), 17.7 parts of phthalic anhydride and 3.0 parts of N,N-dimethylbenzylamine were added, and the mixture was reacted at 120° C. for 6 hours under a nitrogen stream to obtain a partially carboxylated polyol.

② Preparation of a blocked urethane resin aqueous solution

To 2,520.7 parts of the partially carboxylated polyol obtained in step ①, 438.5 parts of tolylene diisocyanate was added, and the mixture was reacted at 80° C. for 3 hours under a nitrogen stream to obtain a urethane prepolymer containing 3.07% of free isocyanate groups. Then, this prepolymer was cooled to 60° C., and 187.9 parts of methyl ethyl ketoxime was dropwise added under stirring over a period of 30 minutes, and the mixture was further reacted at 60° C. for 60 minutes. After confirming that the free isocyanate groups in the urethane polymer became 0%, an aqueous solution prepared by dissolving 4.8 parts of sodium hydroxide in 6,420 parts of water, was added thereto under stirring to obtain a slightly turbid low viscosity blocked urethane resin aqueous solution having a resin content of 33%.

EXAMPLE 2

① Preparation of a blocked urethane resin aqueous solution

To 438.5 parts of tolylene diisocyanate, 187.9 parts of methyl ethyl ketoxime was added over a period of 3 hours while paying an attention so that the internal temperature would not exceed 80° C. under a nitrogen stream, to obtain a completely transparent viscous partially blocked isocyanate having 19.3% of free isocyanate groups. Then, 2,520.7 parts of the partially carboxylated polyol obtained in step ① in Example 1 was added thereto, and the reaction was conducted at 80° C. for 6 hours under a nitrogen stream. After confirming that the free isocyanate groups in the urethane polymer became 0%, an aqueous solution prepared by dissolving 4.8 parts of sodium hydroxide in 6,420 parts of water, was added thereto under stirring to obtain a slightly milky white low viscosity blocked urethane resin aqueous solution having a resin content of 33%.

Comparative Example 1

① Preparation of a blocked resin aqueous solution

To 2,419.9 parts of a polyoxyethylene-oxypropylene polyol having an average molecular weight 2,500 (trifunctional, oxyethylene group content: 80% by weight), 438.5 parts of tolylene diisocyanate was added, and the reaction was conducted at 80° C. for 3 hours under a nitrogen stream to obtain a urethane prepolymer. Then, the prepolymer was cooled to 60° C., and then 187.9 parts of methyl ethyl ketoxime was dropwise added over a period of 30 minutes under stirring. The reaction was further continued at 60° C. for 60 minutes. After confirming that the free isocyanate groups in the urethane polymer became 0%, 6,184.9 parts of water was added under stirring, to obtain a slightly turbid low viscosity blocked urethane resin aqueous solution having a resin content of 33%.

Reference Example 1

The blocked urethane resin aqueous solution prepared in Example 1 was uniformly coated on a polyester doeskin cloth in an amount of 458/m². Two sheets of such cloth were laminated and heat-treated under a pressure 0.3 kg/cm² at 120° C. for 5 minutes. The treated cloth was subjected to the measurement of peel strength in accordance with JIS K6301, and the results are shown in Table 1. The treated cloth was further treated at 140° C. for 60 minutes, and the results of the measurement of the peel strength after the treatment are also shown in Table 1.

Reference Examples 2 to 4

The operation was conducted in the same manner as in Reference Example 1 except that using Examples 1 and 2, the treating temperature and time were changed, and the results are shown in Table 1.

Comparative Example 2

To the blocked urethane resin aqueous solution prepared in Comparative Example 1, dibutyltin dilaulate was added in an amount as identified in Table 1, followed by vigorous stirring to obtain an aqueous solution containing a catalyst. The operation was conducted in the same manner as Reference Examples 1 to 4 except that this aqueous solution was used. The results are shown in Table 1.

TABLE 1

| | Aqueous solution used | Treating temp (°C.) and time (min) | Dibutyltin dilaurate added (%) | Curability* | Peel strength 1 (kgf/inch) | Peel strength 2 (kgf/inch) | Retention (%) |
| --- | --- | --- | --- | --- | --- | --- | --- |
| Reference Example | Example | | | | | | |
| 1 | 1 | 120 × 5 | — | ○ | 0.62 | 0.59 | 90.3 |
| 2 | 1 | 140 × 5 | — | ⊙ | 0.54 | 0.47 | 87.0 |
| 3 | 2 | 120 × 5 | — | ○ | 0.58 | 0.53 | 91.4 |
| 4 | 2 | 140 × 5 | — | ⊙ | 0.52 | 0.44 | 84.6 |
| Comparative Example | Comparative Example | | | | | | |
| 2 | 1 | 120 × 5 | — | x | — | — | — |
| 3 | 1 | 120 × 5 | 0.03 | Δ | 0.28 | 0.11 | 39.3 |
| 4 | 1 | 120 × 5 | 0.30 | ○ | 0.51 | — | 0 |

TABLE 1-continued

|   | Aqueous solution used | Treating temp (°C.) and time (min) | Dibutyltin dilaurate added (%) | Curability* | Peel strength 1 (kgf/inch) | Peel strength 2 (kgf/inch) | Retention (%) |
|---|---|---|---|---|---|---|---|
| 5 | 1 | 140 × 5 | — | x | — | — | — |
| 6 | 1 | 140 × 5 | 0.03 | Δ | 0.55 | 0.21 | 38.2 |
| 7 | 1 | 140 × 5 | 0.30 | ○ | 0.57 | — | 0 |

*◎: Completely cured in less than 5 min
○: Completely cured in 5 min
Δ: Slightly uncured in 5 min
x: Uncured
Peel strength 1: After treatment at 120° C. (or 140° C.) for 5 min
Peel strength 2: Peel strength 1 + treatment at 140° C. for 60 min $$\text{Retention (giving in)} = \frac{\text{Peel strength 2}}{\text{Peel strength 1}} \times 100$$

Application Example

The aqueous composition prepared in Example 1 was sufficiently impregnated to polyester fiber cotton, and an excess aqueous solution was removed so that the solid content deposited would be 30% by weight, followed by heating at 120° C. for 5 minutes to obtain a porous flexible fiber sheet bound by the cured polyurethane. The tensile strength of this sheet was measured in accordance with JIS K7113, whereby the tensile strength was found to be 1.85 kg/cm².

In the same manner, a similar sheet was prepared using the aqueous composition prepared in Example 2. The tensile strength of this sheet was 1.92 kg/cm².

EXAMPLE 3

To 9571.9 parts of the blocked polyurethane aqueous solution prepared in the same manner as Example 1, an aqueous solution prepared by dissolving 46.2 parts of sucrose in 92.4 parts of water, was added, to obtain a slightly turbid aqueous composition containing a low viscosity blocked polyurethane and having solid content of 31%.

EXAMPLE 4

To 9,571.9 parts of the blocked polyurethane aqueous solution prepared in the same manner in Example 2, an aqueous solution prepared by dissolving 92.4 parts of sucrose in 184.8 parts of water, was added to obtain a slightly milky white low viscosity blocked polyurethane resin aqueous composition having a solid content of 31%.

Reference Example 5

The blocked urethane resin aqueous composition prepared in Example 3 was uniformly coated on a polyester doeskin cloth in an amount of 458/m². Then, two sheets of such cloth were laminated and heat-treated under a pressure of 0.3 kg/cm² at 120° C. for 5 minutes. This treated cloth was subjected to the measurement of peel strength in accordance with JIS K6301, and the results are shown in Table 2. Further, the treated cloth was further treated at 140° C. for 60 minutes, and the results of the measurement of peel strength after this treatment are also shown in Table 2.

Reference Examples 6 to 8

The operation was conducted in the same manner as in Reference Example 5 except that the treating temperature and time were changed by using the aqueous compositions of Examples 3 and 4. The results are shown in Table 2.

TABLE 2

| Reference Example | Aqueous solution used Example | Treating temp (°C.) and time (min) | Curability* | Peel strength 1 (kgf/inch) | Peel strength 2 (kgf/inch) | Retention (%) |
|---|---|---|---|---|---|---|
| 5 | 3 | 120 × 5 | ◎ | 0.94 | 0.92 | 97.9 |
| 6 | 3 | 140 × 5 | ◎ | 0.91 | 0.89 | 97.8 |
| 7 | 4 | 120 × 5 | ◎ | 0.95 | 0.93 | 97.9 |
| 8 | 4 | 140 × 5 | ◎ | 0.93 | 0.91 | 97.8 |

*◎: Completely cured in less than 5 min
○: Completely cured in 5 min
Peel strength 1: After treatment at 120° C. (or 140° C.) for 5 min
Peel strength 2: Peel strength 1 + treatment at 140° C. for 60 min
Peel strength 2

EXAMPLE 5

To 3,147.1 parts of the carboxylic acid group-containing blocked polyurethane prior to the addition of the aqueous sodium hydroxide solution prepared in the same manner as in Example 1, 295.9 parts of olive oil was added, and the mixture was stirred for further 30 minutes. Then, an aqueous solution prepared by dissolving 4.8 parts of sodium hydroxide in 7,068 parts of water, was added thereto under stirring, and mixing was conducted at 30° C. for 30 minutes to obtain a slightly turbid low viscosity locked polyurethane aqueous solution having a resin content of 31%.

EXAMPLE 6

A blocked polyurethane aqueous solution was prepared in the same manner as in Example 5 except that the olive oil was changed to coconut oil.

The blocked polyurethane aqueous solutions prepared in Example 5, Example 6 and Example 1 (containing no fatty acid ester), were respectively impregnated to polyester fiber cottons in an amount of 30%, followed by thermal treatment at 130° C. for 5 minute by a hot air generating apparatus. They were further dried at 120° C. for 20 minutes in an oven to obtain foamed cushions. These cushions were subjected to a conbustion test in accordance with HVSS-302, and the results are shown in Table 3.

TABLE 3

| Aqueous solution used | Combustion properties |
| --- | --- |
| Example 5 | Self extinguishing before neaching Reference line A |
| Example 6 | Self extinguishing before neaching Reference line A |
| Example 1 | Combustion speed 50 mm/min |

What is claimed is:

1. A method for producing a porous flexible fiber product, which comprises impregnating an aqueous composition comprising a carboxylate group containing blocked polyurethane to a fiber base material, followed by heating and drying to cure the carboxylate group-containing blocked polyurethane, so that the fibers are connected by the cured substance, wherein said polyurethane is a reaction product of a carboxylic acid (or carboxylate) group-containing polyoxyalkylene polyol containing at least 50% by weight of oxyethylene groups, with an average number of hydroxyl groups being more than 2 and having, on an average, from 0.005 to 0.8 —COOX groups (X: a hydrogen atom or a cation) per molecule, each —COOX group being in a moiety joined at the polyoxyalkylene polyol backbone chain terminals by an ester or urethane linkage, the moiety containing no active hydrogen other than that present in the —COOX group, a polyisocyanate having isocyanate groups in an amount stoichiometrically in excess of the hydroxyl groups of said polyol as the source of the isocyanate groups for polyurethane formation, and a blocking agent in an amount corresponding to the stoichiometrically excess amount of said polyisocyanate, and when X is a hydrogen atom, X is converted to a cation at an optional stage.

2. The method according to claim 1, wherein a cross-linking agent which is a polyfunctional organic compound each of whose functional groups is reactive with isocyanate groups is further incorporated in the aqueous composition in an amount corresponding to from 0,01 to 1 times in equivalents relative to the isocyanate groups regenerated by the heating of the carboxylate group containing blocked polyurethane.

3. The method according to claim 1, wherein the fiber base material is a polyester fiber product of fiber length corresponding to cotton fiber.

4. The method according to claim 2, wherein the polyfunctional organic compound is a polyfunctional alcohol or polyfunctional amine each of whose functional groups is an alcoholic or amino group.

5. The method according to claim 4, wherein the polyfunctional organic compound is a sugar.

6. A method for producing a porous flexible fiber product, which comprises impregnating an aqueous composition comprising a carboxylate group containing blocked polyurethane to a fiber base material, followed by heating and drying to cure the carboxylate group-containing blocked polyurethane, so that the fibers are connected by the cured substance, wherein said polyurethane is a reaction product of a carboxylic acid (or carboxylate) group-containing polyoxyalkylene polyol containing at least 50% by weight of oxyethylene groups, with an average number of hydroxyl groups being more than 2 and having, on an average, from 0.005 to 0.8 —COOX groups (X: a hydrogen atom or a cation) per molecule, each —COOX roup being in a moiety joined at the polyoxyalkylene polyol backbone chain terminals by an ester or urethane linkage, a polyisocyanate having isocyanate groups in an amount stoichiometrically in excess of the hydroxyl groups of said polyol as the source of the isocyanate groups for polyurethane formation, and a blocking agent in an amount corresponding to the stoichiometrically excess amount of said polyisocyanate, and when X is a hydrogen atom, X is converted to a cation at an optional stage, wherein the aqueous composition is an aqueous composition in which from 5 to 20 parts by weight of fatty acid ester are incorporated relative to 100 parts by weight of the carboxylate group-containing blocked polyurethane.

7. A cushion made of a porous flexible fiber product obtained by the method as defined in claim 1.

8. A cushion made of a porous fiber product obtained by the method as defined in claim 2.

9. A cushion made of a porous flexible fiber product obtained by the method as defined in claim 6.

10. The product of the method of claim 3.

11. The product of the method of claim 5.

* * * * *